(12) United States Patent
Godsey et al.

(10) Patent No.: US 10,552,506 B2
(45) Date of Patent: Feb. 4, 2020

(54) CONTEXTUAL BREADCRUMBS DURING NAVIGATION

(71) Applicant: PayPal, Inc., San Jose, CA (US)

(72) Inventors: Sandra Lynn Godsey, San Jose, CA (US); Neelakantan Sundaresan, Mountain View, CA (US)

(73) Assignee: PAYPAL, INC., San Jose, CA (US)

( * ) Notice: Subject to any disclaimer, the term of this patent is extended or adjusted under 35 U.S.C. 154(b) by 284 days.

(21) Appl. No.: 15/198,059

(22) Filed: Jun. 30, 2016

(65) Prior Publication Data

US 2016/0314217 A1    Oct. 27, 2016

Related U.S. Application Data

(63) Continuation of application No. 13/724,979, filed on Dec. 21, 2012, now Pat. No. 9,411,899.

(51) Int. Cl.
| | | |
|---|---|---|
| *G06F 16/954* | (2019.01) | |
| *G06F 3/0481* | (2013.01) | |
| *G06F 3/0482* | (2013.01) | |
| *G06Q 30/06* | (2012.01) | |

(52) U.S. Cl.
CPC .......... *G06F 16/954* (2019.01); *G06F 3/0481* (2013.01); *G06F 3/0482* (2013.01); *G06Q 30/06* (2013.01); *G06Q 30/0641* (2013.01)

(58) Field of Classification Search
CPC ................. G06F 3/0482; G06F 3/0481; G06F 17/30873; G06F 16/954; G06Q 30/0641; G06Q 30/06
See application file for complete search history.

(56) References Cited

U.S. PATENT DOCUMENTS

| | | | |
|---|---|---|---|
| 8,943,442 B1* | 1/2015 | Oberheu | ............... G06F 3/0482 |
| | | | 715/810 |
| 2006/0123361 A1* | 6/2006 | Sorin | ................ G06F 17/30873 |
| | | | 715/854 |

* cited by examiner

*Primary Examiner* — Amy M Levy
(74) *Attorney, Agent, or Firm* — Maschoff Brennan

(57) ABSTRACT

A system and method of providing contextual breadcrumbs is disclosed. A current page may be caused to be displayed on a device. Contextual breadcrumbs may be caused to be displayed on the current page. The contextual breadcrumbs may comprise a simplified representation of a first different page. The first different page may be different from the current page. The simplified representation of the first different page may comprise context information regarding a function of the first different page. The context information regarding a function of the first different page may comprise a visual representation of functional options of the first different page. At least one of the contextual breadcrumbs may be configured to enable the user to act upon the functional options of the first different page from the current page.

17 Claims, 13 Drawing Sheets

CONTEXTUAL BREADCRUMBS DURING NAVIGATION

PRIORITY

This application is a Continuation of and claims the benefit of priority to U.S. application Ser. No. 13/724,979 filed on Dec. 21, 2012, the contents of which are incorporated herein by reference in their entirety.

TECHNICAL FIELD

The present application relates generally to the technical field of navigation of pages, and, in various embodiments, to systems and methods of providing visual contextual breadcrumbs during the navigation of pages.

BACKGROUND

When users navigate through a flow of multiple web pages during a session on a website, the users may often become lost as to where they are, where they came from, and where they are going within the context of the flow of web pages. Such confusion regarding the context of web pages within the flow of web pages may lead to a negative user experience on the website.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
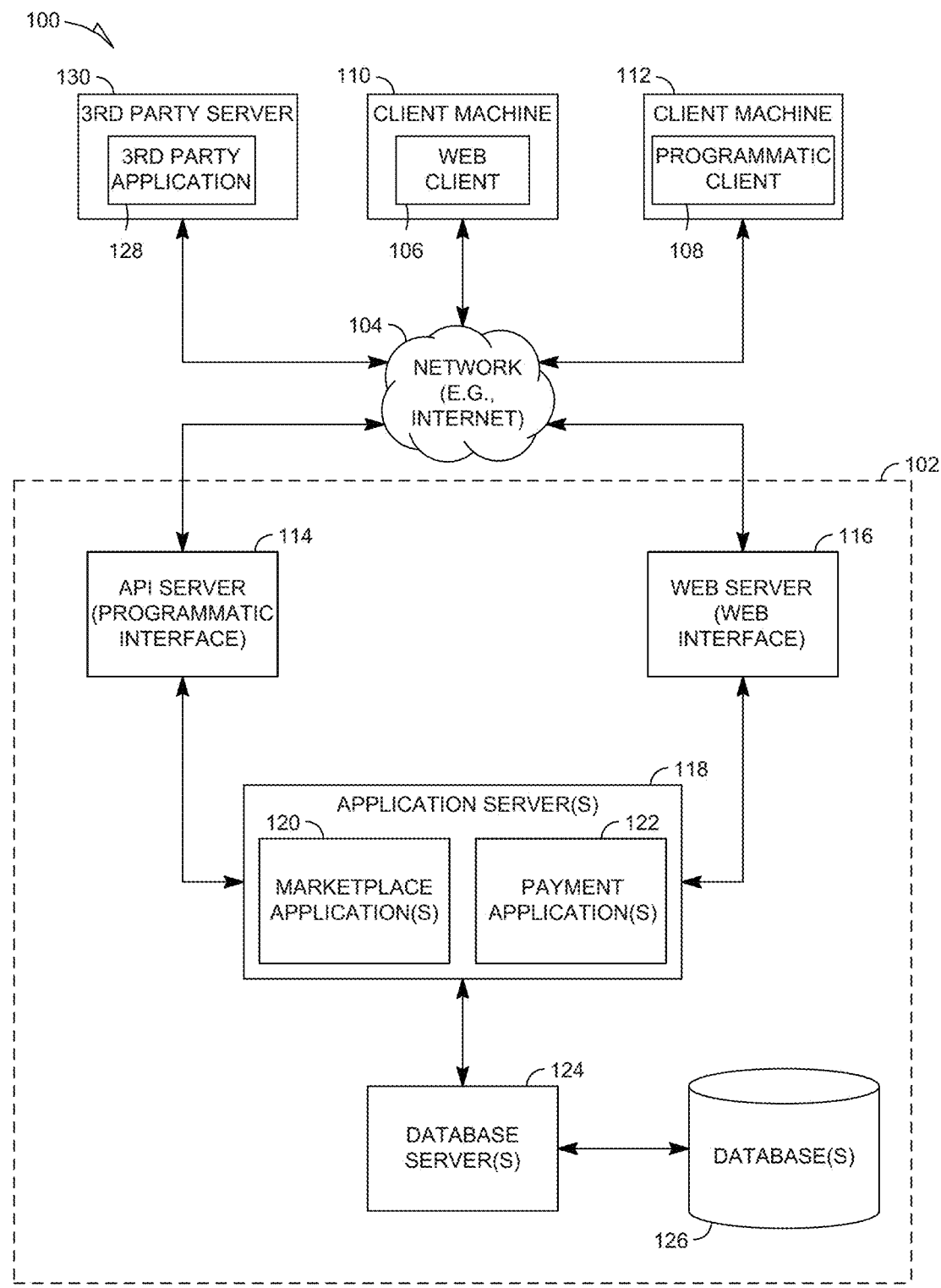
FIG. 1 is a block diagram depicting a network architecture of a system, according to some embodiments, having a client-server architecture configured for exchanging data over a network.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure describes systems and methods of providing contextual breadcrumbs during the navigation of pages. In some embodiments, the pages may be web pages. However, it is contemplated that other types of pages are also within the scope of the present disclosure, including, but not limited to, the pages of a software application that are displayed on a device (e.g., a software application on a mobile device). The contextual breadcrumbs may comprise context information of pages. The context information may comprise information regarding a function of a page and may be carried forward in a visual form to the next page in a flow of pages during navigation. In some embodiments, a minimal and useful part of a page's context may be carried forward. During navigation, the user may branch off along one path. The user may then subsequently come back to the same branching page and branch off along a different path. These paths may be represented in the contextual breadcrumbs. Context information from one page in the flow of pages may be carried forward to the next page in the flow of pages. The context information may be accumulated and edited as the user flows through the pages.

In some embodiments, the contextual breadcrumbs may be provided in the form of one or more floating widgets. A flow of actions (e.g., user actions on an e-commerce site) may be captured in a widget. Variations in actions may be shown through choices displayed in the widget. In some embodiments, an accumulation of actions may be shown through a cascade of widgets that allows for properties of the widgets to be changed at any point in the cascade. The changing of properties of the widgets may be conditioned upon the changes not contradicting or invalidating other widget instances. In some embodiments, the properties of a widget may be changed even if the change does contradict or invalidate another widget instance. In some embodiments, the widget affected by this contradictory or invalidating change may be visually presented in a form indicating the contradiction or invalidation. In some embodiments, the affected widget may be displayed in a distinguishing color to indicate how it is affected. For example, the affected widget may be colored red to indicate that the widget is in an error state or an inconsistent state.

In some embodiments, a system may comprise at least one processor, at least one navigation application, and at least one contextual breadcrumb application. The navigation application(s), which may be executable by the processor(s), may be configured to cause a current page to be displayed on a device, and to cause contextual breadcrumbs to be displayed on the current page. The contextual breadcrumbs may comprise a simplified representation of a first different page. The first different page may be different from the current page. The simplified representation of the first different page may comprise context information regarding a function of the first different page.

In some embodiments, a computer-implemented method may comprise causing a current page to be displayed on a device, and causing contextual breadcrumbs to be displayed on the current page. The contextual breadcrumbs may comprise a simplified representation of a first different page. The first different page may be different from the current page.

The simplified representation of the first different page may comprise context information regarding a function of the first different page.

In some embodiments, a non-transitory machine-readable storage device may store a set of instructions that, when executed by at least one processor, causes the at least one processor to perform operations comprising causing a current page to be displayed on a device, and causing contextual breadcrumbs to be displayed on the current page. The contextual breadcrumbs may comprise a simplified representation of a first different page. The first different page may be different from the current page. The simplified representation of the first different page may comprise context information regarding a function of the first different page.

In some embodiments, the first different page may be caused to be displayed on the device, and a user action on the first different page may be received. In some embodiments, the current web page may be caused to be displayed on the device in response to the user action. In some embodiments, the first different page may comprise a plurality of functional options, with each functional option of the first different page being configured to be acted upon by a user. The user action may comprise a user action on one of the functional options of the first different page. The context information of the first different page may comprise a visual representation of the plurality of functional options of the first different page. In some embodiments, the plurality of functional options of the first different page may comprise actionable interface elements. In some embodiments, at least one of the contextual breadcrumbs may be configured to enable the user to act upon the plurality of functional options of the first different page from the current page. In some embodiments, the contextual breadcrumbs may further comprise a simplified representation of the current page and a visual representation of a flow from the simplified representation of the first different page to the simplified representation of the current page. The simplified representation of the current page may comprise context information regarding a function of the current page. In some embodiments, the current page may comprise a plurality of functional options, with each functional option of the current page being configured to be acted upon by the user. At least one functional option of the current page may be configured to lead to a second different page in response to being acted upon by the user. The second different page may be different from the current page and the first different page. The context information regarding a function of the current page may comprise a visual representation of the plurality of functional options of the current page. The contextual breadcrumbs may further comprise a flow from current page to the second different page. In some embodiments, the contextual breadcrumbs may further comprise context information regarding a function of the second different page. In some embodiments, the context information regarding a function of the second different page may comprise a visual representation of the plurality of functional options of the second different page. In some embodiments, the current page and the first different page are web pages.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An application programming interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
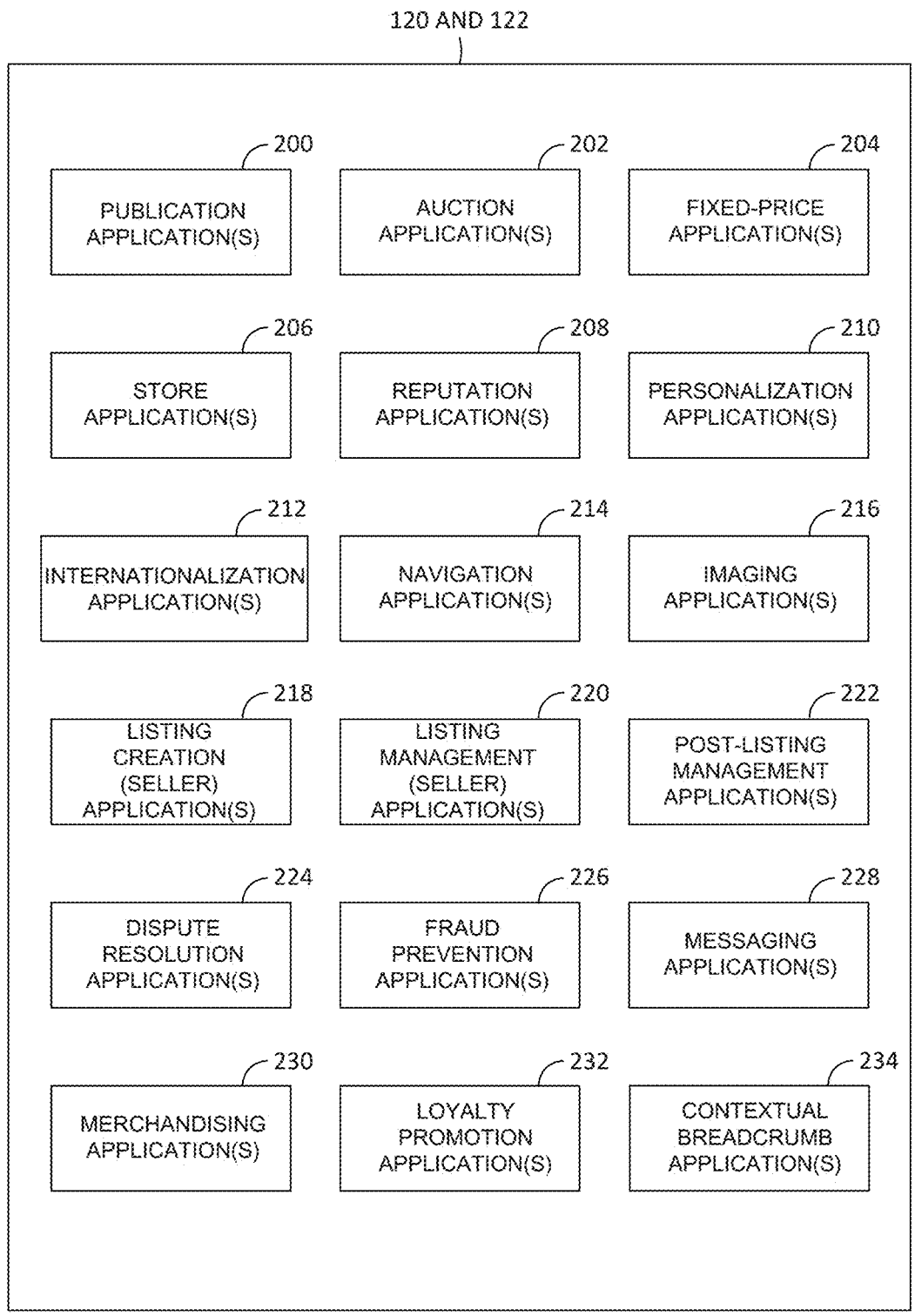
FIG. 2 is a block diagram depicting various components of a network-based publisher, according to some embodiments.

FIG. 2 is a block diagram illustrating multiple marketplace and payment applications 120 and 122 that, in one example embodiment, are provided as part of the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may, furthermore, access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page on which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may, accordingly, include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications. In some embodiments, the navigation application(s) 214 may be configured to cause a first web page to be displayed on a device, receive a user action on the first web page, and cause a second web page to be displayed on the device in response to the user action.

In order to make the listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such as, for example, messages advising users regarding the status of listings at the networked system 102 (e.g., providing "outbid" notices to bidders during an auction process or to providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

One or more contextual breadcrumb applications 234 may be configured to cause contextual breadcrumbs to be displayed on a page. As previously discussed, the page may be web page. However, it is contemplated that other types of pages are also within the scope of the present disclosure, including, but not limited to, the pages of a software application that are displayed on a device (e.g., a software application on a mobile device). The contextual breadcrumbs may comprise a simplified representation of another page. The simplified representation of the other page may comprise context information regarding a function of the other page. This other page may be a page that has already been displayed or a page that may possibly be subsequently displayed in a flow of pages of which the page currently being displayed is a part. The contextual breadcrumbs may also comprise a simplified representation of the page currently being displayed. The simplified representation of the currently-displayed page may comprise context information regarding a function of the currently-displayed page. Additional features of the contextual breadcrumbs will be discussed in further detail below.

Figure 3:
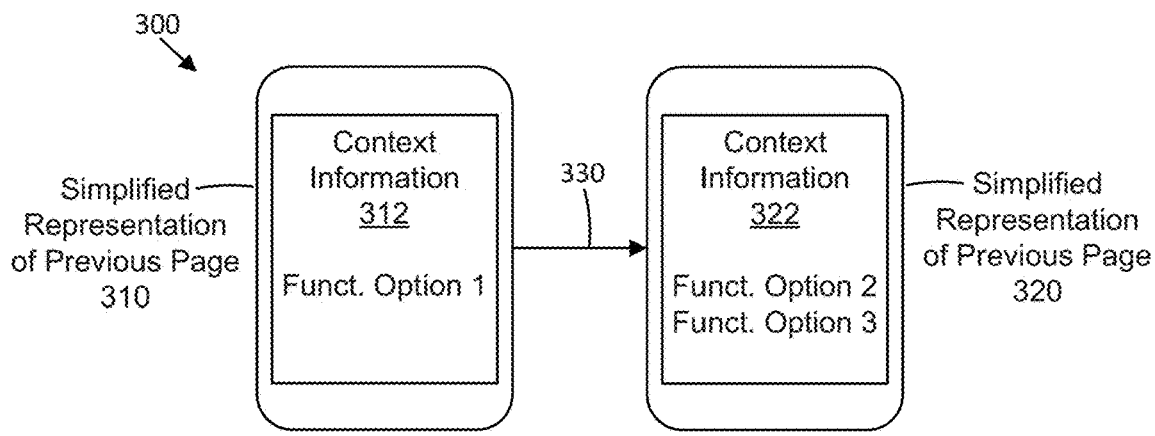
FIG. 3 illustrates an example embodiment of contextual breadcrumbs.

FIG. 3 illustrates an example embodiment of contextual breadcrumbs 300. In FIG. 3, it may be assumed that a current page in a flow of pages is currently being displayed. Contextual breadcrumbs 300 may comprise simplified representations 310 and 320 of previous pages in the flow of pages. In some embodiments, contextual breadcrumbs 300 may comprise simplified representations of all of the previous pages in a flow of pages for a single website. For example, in some embodiments, the contextual breadcrumbs 300 may comprise simplified representations of all of the pages between the home page of the website and the current page.

In some embodiments, contextual breadcrumbs 300 may comprise a visual representation of the flow from one previous page to another. For example, in some embodiments, an arrow (or some other connection indicator) 330 may be used to visually represent the flow from one previous page to another. In some embodiments, this visual representation may be achieved by displaying the arrow 330 between the simplified representation of one previous page 310 and the simplified representation of another previous page 320.

In some embodiments, the simplified representations 310 and 320 may each comprise context information 312 and 322, respectively, of the pages they respectively represent. In some embodiments, the context information 312 and 322 comprises information regarding a function of the respective page. For example, if simplified representation 310 represents a search page previously displayed in a flow of pages and on which a search query may be entered, and if simplified representation 320 represents a previously-displayed search results page for the entered search query in the flow of pages, context information 312 may comprise information indicating the function of the previously-displayed search page, and even the entered search query, and context information 322 may comprise information indicating the function of the search results page. This information regarding the function of the pages for which the simplified representations 310 and 320 respectively represent provides valuable context information to the user.

In some embodiments, the context information of a page may comprise a visual representation of one or more functional options of the page. The functional options of a page may comprise actionable interface elements, which are elements that a user may act upon. Examples of actionable interface elements include, but are not limited to, selectable links or widgets, textual input elements, and non-textual input elements. In FIG. 3, context information 312 may comprise one functional option (Functional Option 1) and context information 322 may comprise two functional options (Functional Option 2 and Functional Option 3). It is contemplated that other configurations are within the scope of the present disclosure. In some embodiments, the visual representation of the functional option(s) may comprise one or more selectable links. For example, if a page is a search results page, the context information of that page may comprise a visual representation of the selectable search results on that page. It is contemplated that other forms of functional options are within the scope of the present disclosure. In some embodiments, a functional option of a previous page may be acted upon by a user on the current page via engagement with the functional option in the visual representation being displayed on the current page. In the search results page example discussed above, the user may select (e.g., click or tap) one of the selectable search results in the contextual breadcrumbs on the current page. This selection of the search result in the contextual breadcrumbs may be treated as the equivalent of the user making the selection directly from the search results page.

Figure 4:
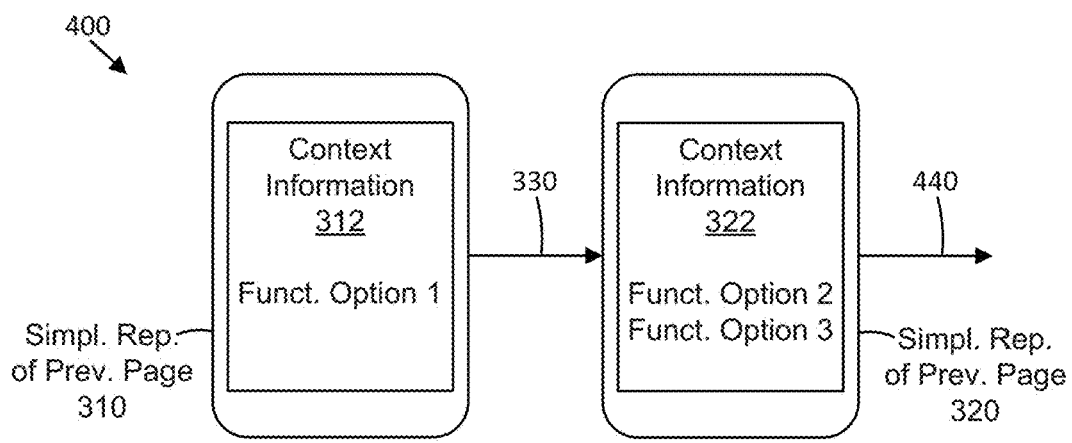
FIG. 4 illustrates another example embodiment of contextual breadcrumbs.

FIG. 4 illustrates another example embodiment of contextual breadcrumbs 400. Contextual breadcrumbs 400 may comprise the same elements as contextual breadcrumbs 300 in FIG. 3. However, contextual breadcrumbs 400 may also comprise an arrow (or some other connection indicator) 440 connected to the last simplified representation 320 in the flow in order to help visually represent the flow from the page of this last simplified representation 320 to the current page (which does not have a simplified representation in FIG. 3 or in FIG. 4). This hanging arrow 440 may represent the fact that there are no more previous pages in the flow of pages.

Figure 5:
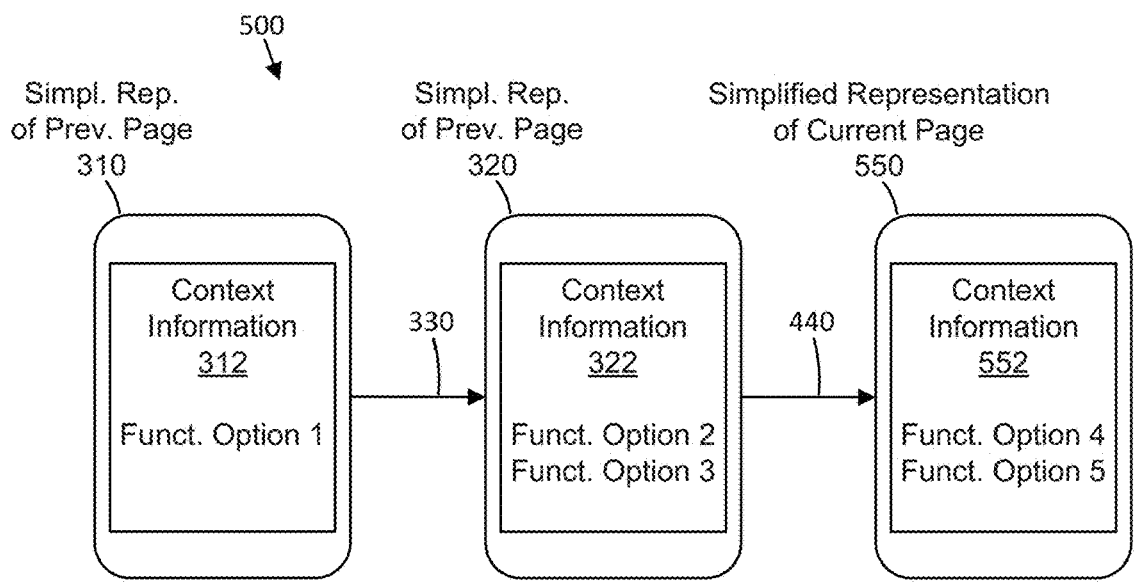
FIG. 5 illustrates yet another example embodiment of contextual breadcrumbs.

FIG. 5 illustrates yet another example embodiment of contextual breadcrumbs 500. Contextual breadcrumbs 500 may comprise the same elements as contextual breadcrumbs 400 in FIG. 4. However, contextual breadcrumbs 500 may also comprise a simplified representation 550 of the current page. Similar to the simplified representations 310 and 320 of the previous pages, the simplified representation 550 of the current page may comprise context information 552 of the current page and one or more functional options of the current page (e.g., Functional Option 4 and Functional Option 5). The context information 552 of the current page may comprise any of the features discussed above with respect to the context information 312 and 322 in FIGS. 3 and 4. The one or more functional options of the current page may also comprise any of the features discussed above with respect to the one or more functional options in FIGS. 3 and 4.

Figure 6:
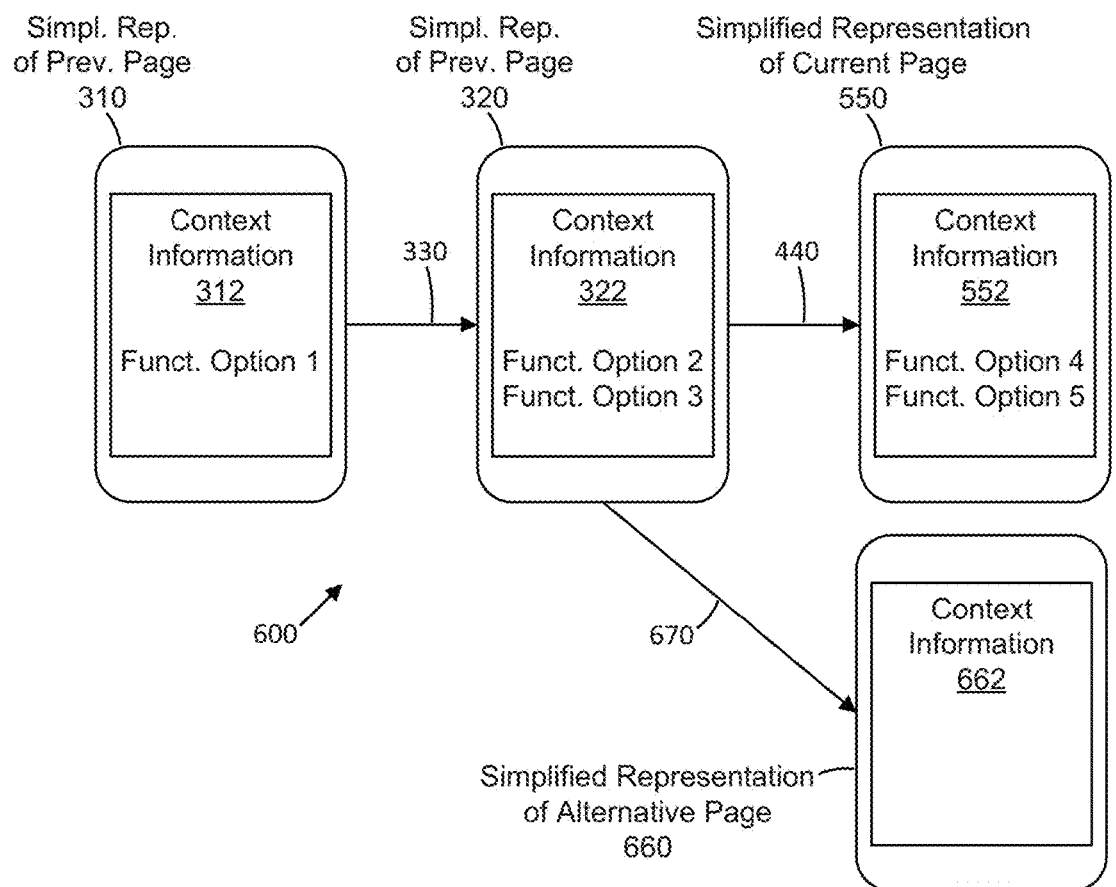
FIG. 6 illustrates yet another example embodiment of contextual breadcrumbs.

FIG. 6 illustrates yet another example embodiment of contextual breadcrumbs 600. Contextual breadcrumbs 600 may comprise the same elements as contextual breadcrumbs 500 in FIG. 5. However, contextual breadcrumbs 600 may also comprise a simplified representation 660 of an alternative page. The simplified representation 660 of an alternative page may represent a page that would have resulted from the user making a different functional decision on one of the previous pages. For example, if the simplified representation 320 represents a search results page having multiple selectable search results, the user may have selected the first search result, thereby causing the resulting page for that search result to be displayed as the current page, which may be represented in the contextual breadcrumbs by the simplified representation 550 of the current page. Since the user had the functional option of selecting a different search result, such as a second search result, a simplified representation 660 of a page resulting from the selection of this different search result may be included in the visual breadcrumbs 600 in order to inform the user as to what course of action he or she could have taken. The contextual breadcrumbs 600 may also comprise an arrow (or some other connection indicator) 670 connecting the simplified representation 320 of the previous page, from where the user may have made a different functional decision than the functional decision that resulted in the current page, to the simplified representation 660 of the alternative page.

Similar to the simplified representations 310 and 320 of the previous pages and the simplified representation 550 of the current page, the simplified representation 660 of the alternative page may comprise context information 662 of the alternative page. The context information 662 of the alternative page may comprise any of the features discussed above with respect to the context information 312, 322, and 552 in FIGS. 3, 4, and 5. The context information 662 of the alternative page may also comprise one or more functional options of the alternative page. The one or more functional options of the current page may also comprise any of the features discussed above with respect to the one or more functional options in FIGS. 3, 4, and 5. In FIG. 6, no functional options are shown in the simplified representation 660 of the alternative page, indicating that no functional options are available on the particular alternative page being represented. It is contemplated that some functional options of a page may be represented in the simplified representation of that page, while other functional options of the page may not be represented in the simplified representation of that page.

Figure 7:
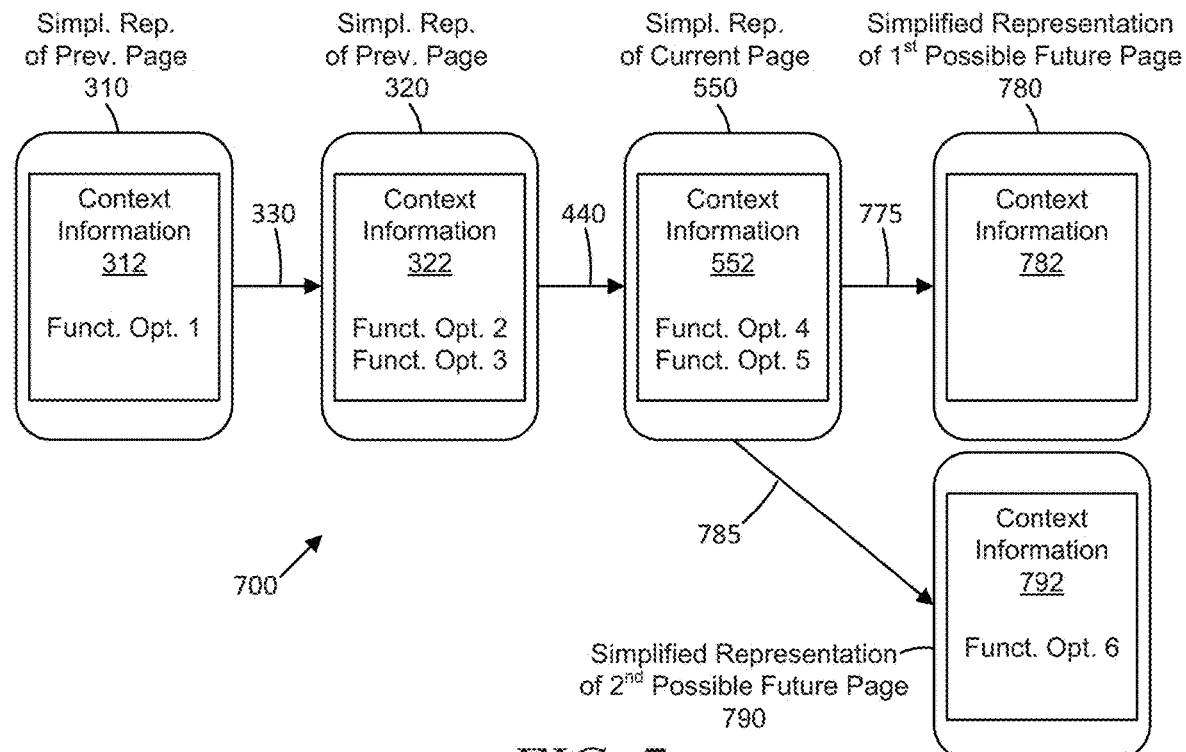
FIG. 7 illustrates yet another example embodiment of contextual breadcrumbs.

FIG. 7 illustrates yet another example embodiment of contextual breadcrumbs 700. Contextual breadcrumbs 700 may comprise the same elements as contextual breadcrumbs 500 in FIG. 5. However, contextual breadcrumbs 700 may also comprise one or more simplified representations of possible future pages. The simplified representation 780 of a possible future page may represent a page that can result from the user making a functional decision on the current page. For example, if the simplified representation 550 represents a currently-displayed search results page having multiple selectable search results, the user may have the option of selecting the first search result, which would cause the resulting page for that search result to be displayed. This resulting page of the first search result may be represented in the contextual breadcrumbs by the simplified representation 780 of this first possible future page. Since the user may have the functional option of selecting a different search result, such as a second search result, a simplified representation 790 of a page resulting from the selection of this second search result may be included in the visual breadcrumbs 700 in order to inform the user as to what course of action he or she may take and the consequences of such action. The contextual breadcrumbs 700 may also comprise arrows (or some other connection indicators) 775 and 785 connecting the simplified representation 550 of the current page, from where the user may make different functional decisions that result in different possible future pages, to the simplified representations 780 and 790 of these possible future pages.

Similar to the simplified representations previously discussed, the simplified representations 780 and 790 of the possible future pages may comprise context information 782 and 792, respectively, of the possible future pages. The context information 782 and 792 of the possible future pages may comprise any of the features discussed above with respect to the context information previously discussed. The context information 782 and 792 of the possible future pages may also comprise one or more functional options of the possible future pages. The one or more functional options of the possible future pages may also comprise any of the features of the one or more functional options previously discussed. In FIG. 7, no functional options are shown in the simplified representation 780 of the first possible future page, indicating that no functional options are available on the first possible future page being represented. However, in FIG. 7, the context information 792 in the simplified representation 790 of the second possible future page is shown as comprising one functional option (Functional Option 6). It is contemplated that some functional options of a page may be represented in the simplified representation of that page, while other functional options of the page may not be represented in the simplified representation of that page It is contemplated that any combination of the features of the contextual breadcrumbs in FIGS. 3-7 may be employed. Additionally, any number of simplified representations of previous pages, current pages, alternative pages, possible future pages, and functional options may be used. Furthermore, the contextual breadcrumbs may be configured to enable the user to navigate his or her way to a page by selecting (e.g., clicking) the simplified representation of that page. In this fashion, the user may use the contextual breadcrumbs to load a certain page (e.g., the last page the user viewed on the website) instead of using the navigation bar on the web browser (e.g., clicking the back button).

FIGS. 8A-8G illustrate an example embodiment of a flow of multiple pages accompanied by contextual breadcrumbs. The contextual breadcrumbs of FIGS. 8A-8G are similar to the contextual breadcrumbs 300 of FIG. 3, where simplified representations of previous pages are displayed on the current page, but simplified representations of the current page, alternative pages, and possible future pages are not displayed. However, it is contemplated that any of the forms of contextual breadcrumbs in FIGS. 3-7 may be employed. Additionally, other forms of contextual breadcrumbs are also within the scope of the present disclosure.

Figure 8A:
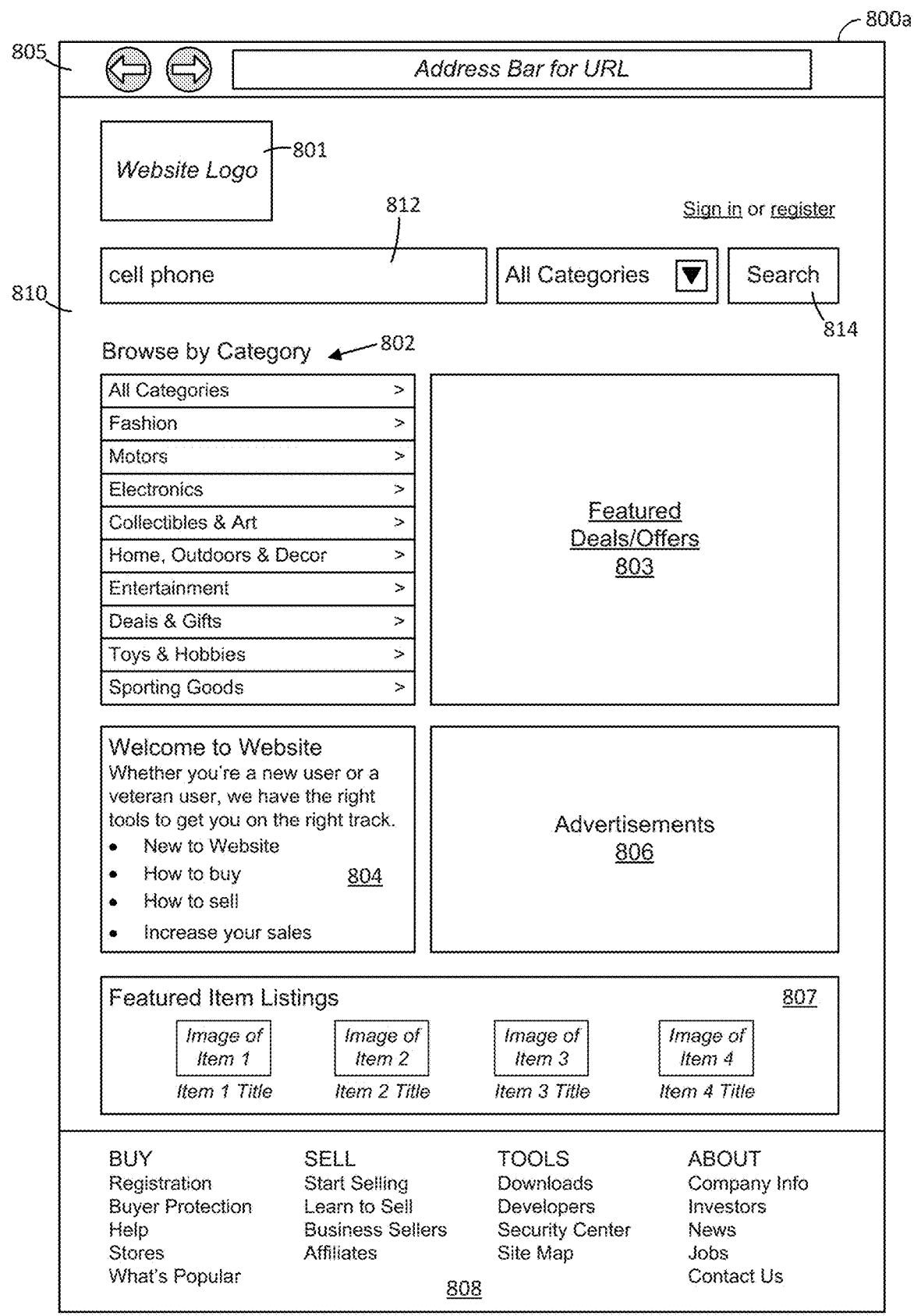
FIGS. 8A-8G illustrate an example embodiment of a flow of multiple pages accompanied by contextual breadcrumbs.

The flow of multiple pages may be for a single website. FIG. 8A illustrates an example embodiment of one page 800a in a flow of pages for a website being displayed in a web browser. In some embodiments, the web browser comprises a navigation bar 805. The navigation bar 805 may comprise a selectable back button to enable a user to go to the previous page and a selectable forward button to enable a user to go the next page, as well as an address bar to enable a user to enter and go to a web address. It is contemplated that the navigation bar 805 may comprise other functional and non-functional components as well.

In some embodiments, the single website may be an e-commerce site. However, it is contemplated that other types of websites are within the scope of the present disclosure. In some embodiments, the page 800a may be a home page of the website. The page 800a may comprise a body 810. The body 810 may comprise a variety of content, including, but not limited to, a website or company logo 801, categories that may be browsed 802, featured deals or offers 803, general information 804 regarding the website and functions that may be performed on the website, advertisements 806, featured item listings 807 with image titles and corresponding images of the images, and basic content 808 that may be displayed on every page of the site. Some of the content in the body may be selectable and some of the content in the body may not be selectable. Page 800a may also comprise a search field 812 for entering one or more query terms and a selectable search button 814 to cause a search on the one or more entered query terms when activated by a user.

Figure 8B:
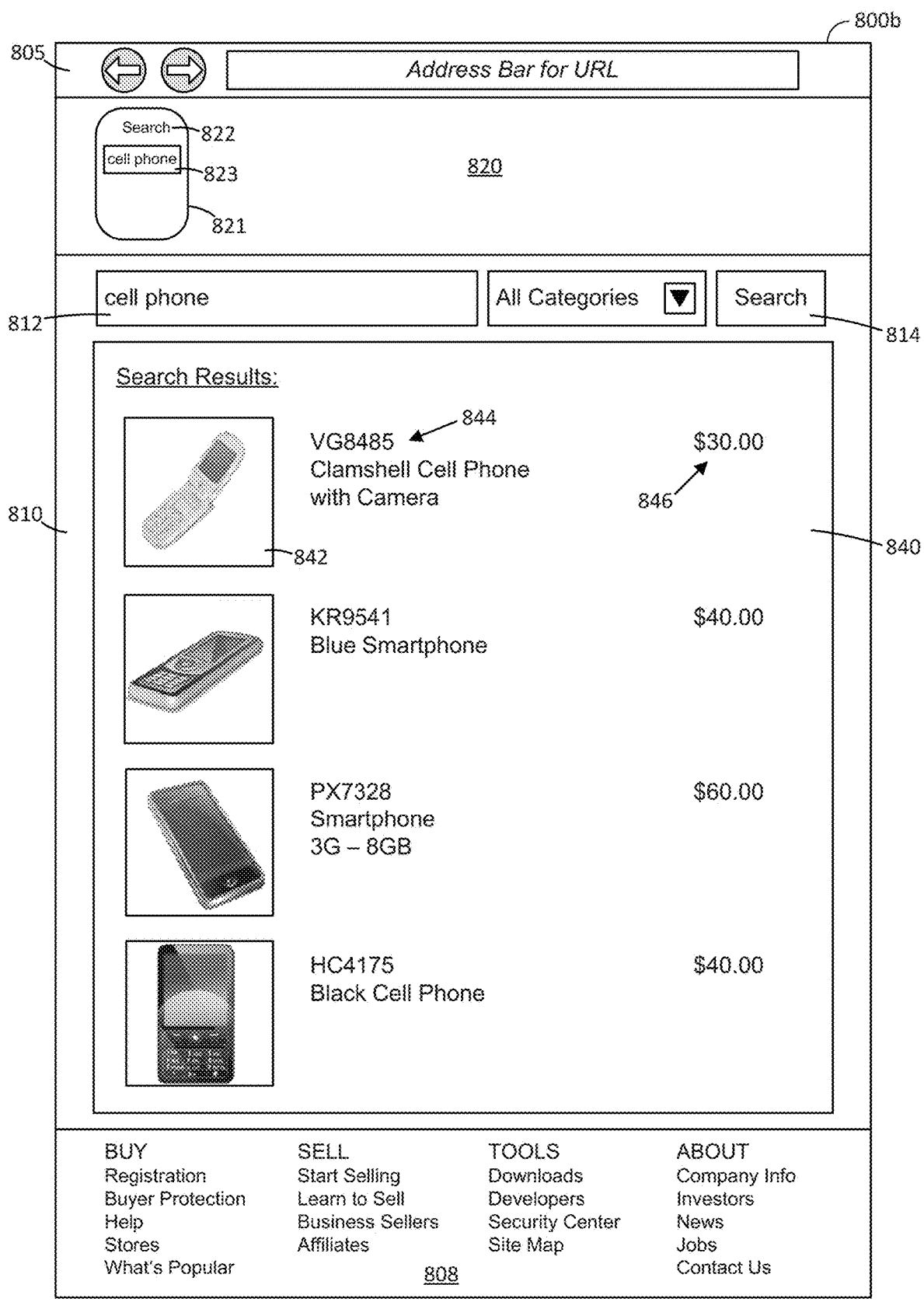

FIG. 8B illustrates an example embodiment of the next page 800b in the flow of pages, which may be a search results page provided in response to a search being performed on the query terms "cell phone" on page 800a. The body 810 of the search results page may comprise a search results section 840. The search results section 840 may comprise multiple item listings (e.g., cell phone item listings). Each item listing may comprise an image of an item 842, a title or name of the item listing 844, and a price of the item 846. It is contemplated that other configurations are within the scope of the present disclosure. In FIG. 8B, the page 800b displays four item listings in the search results section 840 with the following titles: VG8485 Clamshell Cell Phone with Camera, KR9541 Blue Smartphone, PX7328 Smartphone 3G-8GB, and HC4175 Black Cell Phone.

Page 800b may comprise a contextual breadcrumbs section 820 for displaying contextual breadcrumbs. The contextual breadcrumbs section 820 may comprise a simplified representation 821 of page 800a in FIG. 8A. The simplified representation 821 may comprise context information regarding a function of the page 800a. For example, the context information may comprise an identification of page 800a as a page on which a search was performed, which may be represented by the label "Search" 822 and a visual representation of the search box 823 with the query terms for which the search was performed (e.g., "cell phone").

Figure 8C:
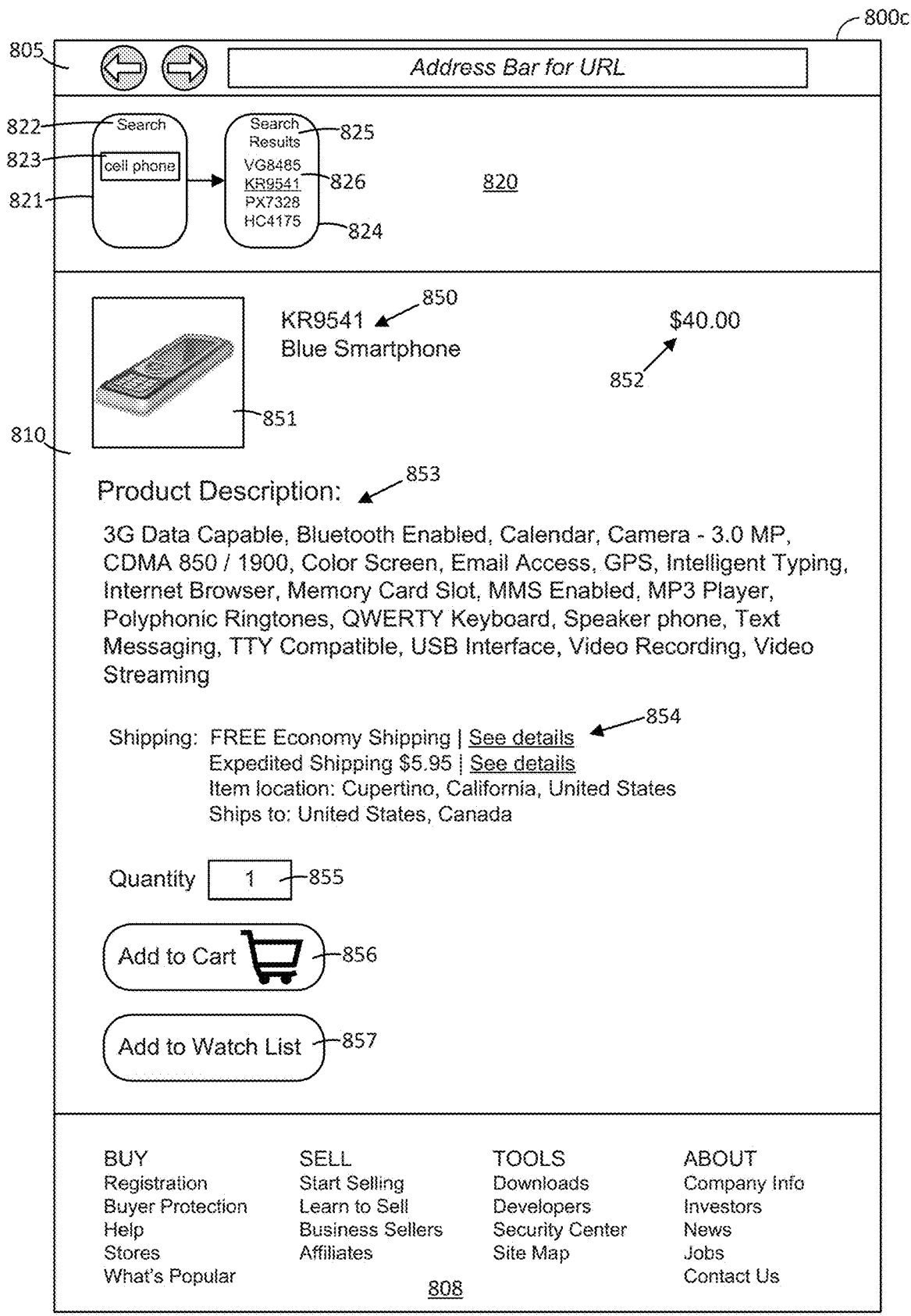

FIG. 8C illustrates an example embodiment of the next page 800c in the flow of pages, which may be an item listing page for one of the search results displayed in FIG. 8B. The item listing page may be provided in response to a user selecting (e.g., clicking) one of the search results displayed in FIG. 8B. The item listing page may comprise a title or name for the item of the item listing 850, an image of the item 851, a price of the item 852, a product description 853, and shipping options for the item 854. In some embodiments, the item listing page may also comprise a quantity field 855 for a user to enter a quantity of the item the user wants to purchase, a selectable "Add to Cart" button 856 for a user to add the entered quantity of the item to a shopping cart, and a selectable "Add to Watch List" button 857 for a user to add the item listing to a watch list so that the user may be notified of a change in status of the item listing.

In the contextual breadcrumbs section 820 of page 800c, a simplified representation 824 of page 800b may be added. In some embodiments, a visual representation of the flow from page 800a to page 800b may be represented in the contextual breadcrumbs. For example, an arrow (or some other connection indicator) may be used to show this flow. The simplified representation 824 may comprise context information regarding a function of the page 800b. For example, the context information may comprise an identification of page 800b as a page on which search results were provided, which may be represented by the label "Search Results" 825 and a visual representation of the search results 826. In some embodiments, the context information may comprise a visual representation of a selection or action of the user. For example, the visual representation of the search results 826 may comprise an indication of which search result the user selected (e.g., KR9541). This indication may be provided in the form of the selected search result being underlined. However, it is contemplated that other forms of visually indicating a user action are within the scope of the present disclosure.

Figure 8D:
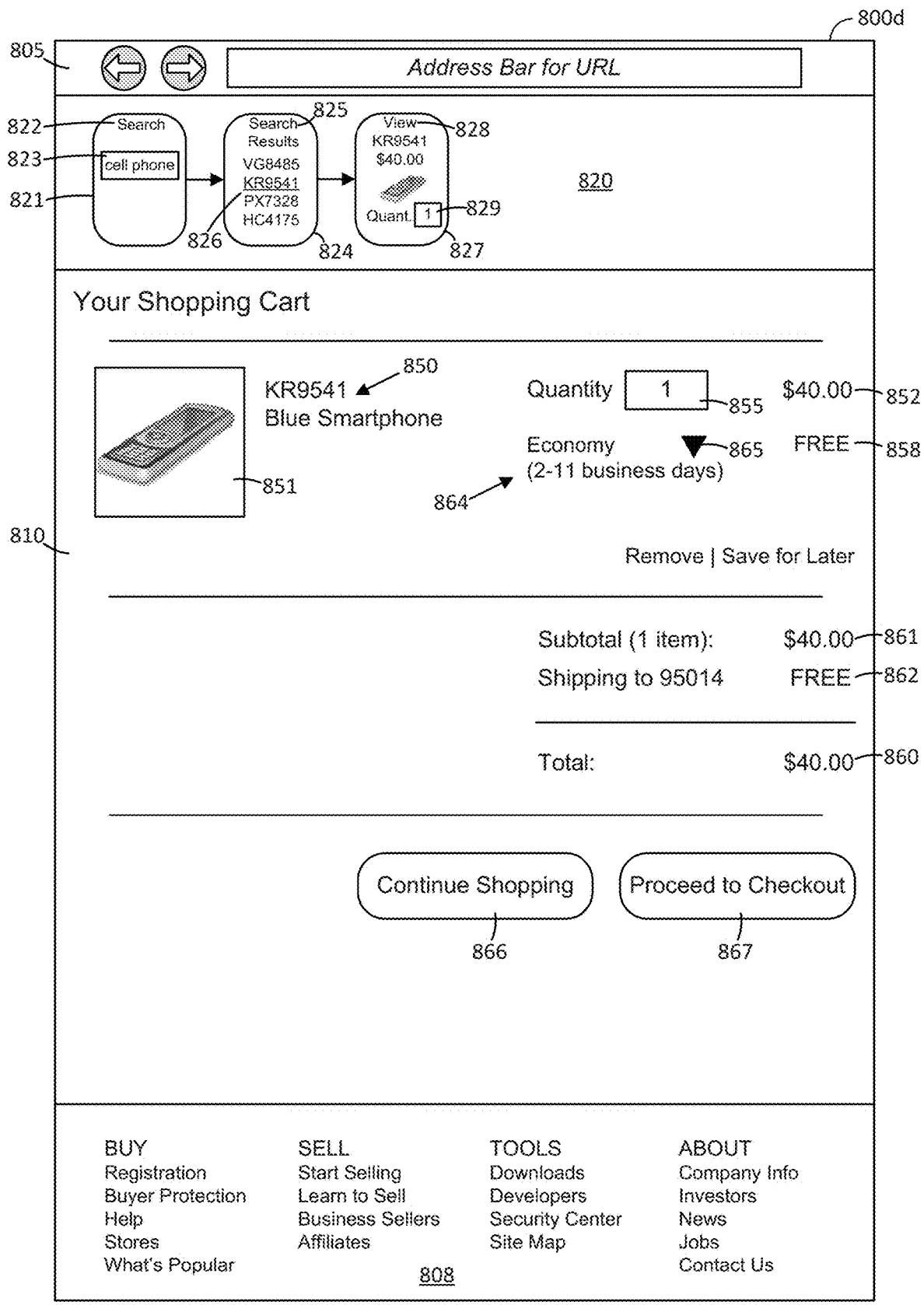

FIG. 8D illustrates an example embodiment of the next page 800d in the flow of pages, which may be a shopping cart page. The shopping cart page may be provided in response to a user selecting (e.g., clicking) the "Add to Cart" button 856 in FIG. 8C. The shopping cart page may comprise information about any item that has been added to the shopping cart of the website. For example, the shopping cart page may comprise the title or name for the item of the item listing 850, the image of the item 851, the price of the item 852, and the quantity of the item in the shopping cart 855. The shopping cart page may also comprise a shipping option 864 for the item and a shipping price 858 corresponding to the shipping option 864. In some embodiments, the shipping option 864 may be changed using a selectable mechanism 865 (e.g., a drop down menu). The shopping cart page may also comprise a subtotal 861 for the price of all of the items in the shopping cart, a total shipping cost 862 for all of the items in the shopping cart, and the total purchase and shipping costs 860 for all of the items in the shopping cart. The shopping cart page may additionally comprise a selectable "Continue Shopping" button 866 to enable the user to return to one of the previous pages (e.g., the search results page) and a selectable "Proceed to Checkout" button 867 to enable the user to proceed to a checkout page, where the user may go through a checkout process for the items in the shopping cart.

In the contextual breadcrumbs section 820 of page 800d, a simplified representation 827 of page 800c may be added. In some embodiments, a visual representation of the flow from page 800b to page 800c may be represented in the contextual breadcrumbs. For example, an arrow (or some other connection indicator) may be used to show this flow. The simplified representation 827 may comprise context information regarding a function of the page 800c. For example, the context information may comprise an identification of page 800c as a page on which an item listing was viewed, which may be represented by the label "View" 828. In some embodiments, the context information may comprise a simplified version some of the details of the viewed item listing. In some embodiments, these details may comprise the title of the item listing (e.g., KR9541), the price of the item (e.g., $40.00), and the image of the item. In some embodiments, the context information may comprise a visual representation of a selection or action of the user. For example, in FIG. 8D, the context information in simplified representation 827 may comprise a visual representation 829 of the quantity of the item that the user added to the shopping cart (e.g., 1).

In some embodiments, the contextual breadcrumbs may be configured to enable a user to act upon functional options that are visually represented in the simplified representation of a page. For example, although the shopping cart page is being displayed in FIG. 8D, the user may select one of the search results visually represented in the simplified representation 824 of the search result page. As a result of this user action (e.g., clicking) on a functional option (e.g., a selectable link for an item listing in the search results) in the simplified representation, the selected functional option may be performed. In this example, if the user clicks on "PX7328" in the simplified representation 824 of FIG. 8D, the item listing page for the corresponding item listing may be displayed.

Figure 8E:
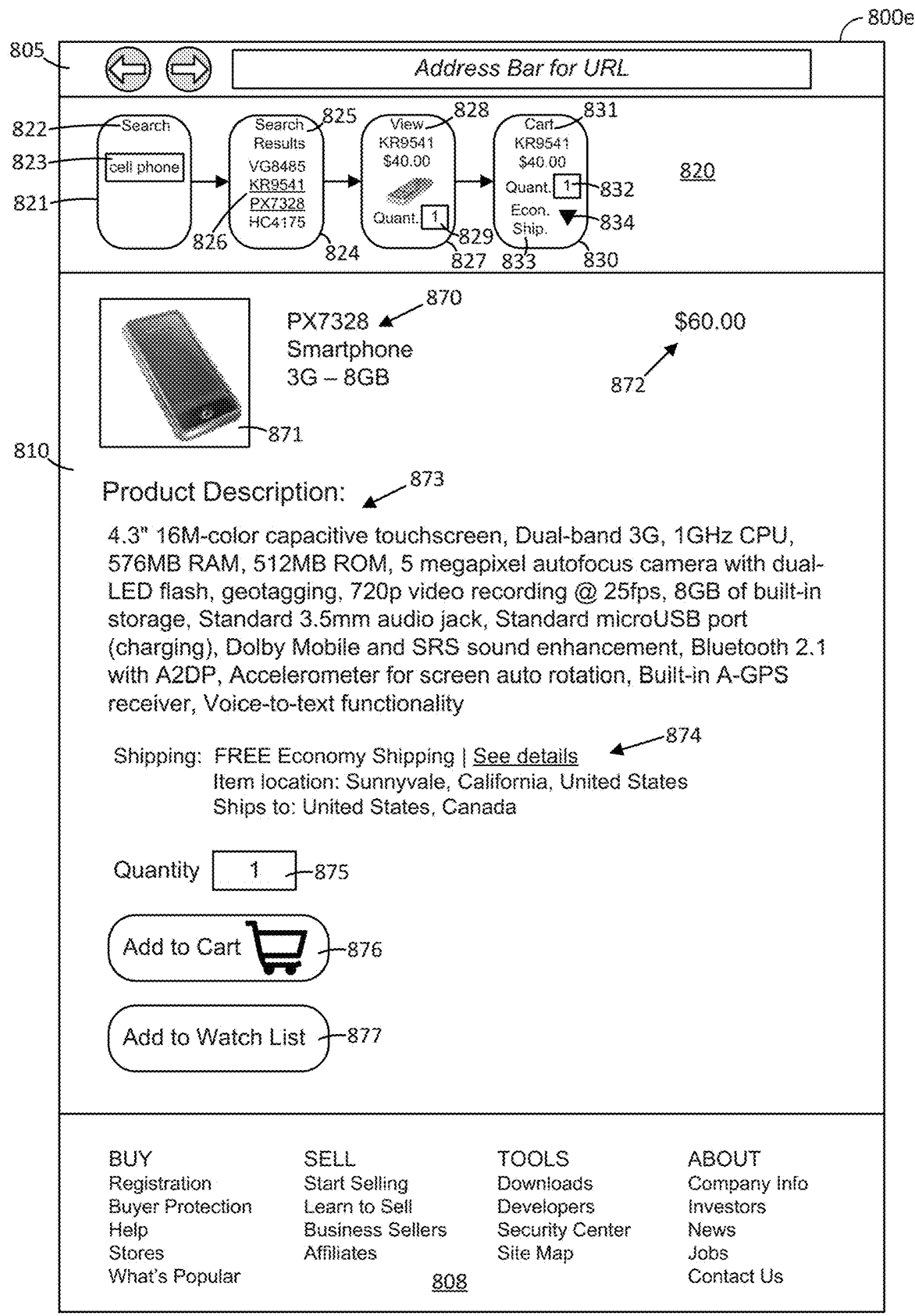

FIG. 8E illustrates an example embodiment of the page 800c, which may be an item listing page for the item listing selected in the simplified representation 824 of FIG. 8D (e.g., PX7328). The item listing page may comprise a title or name for the item of the item listing 870, an image of the item 871, a price of the item 872, a product description 873, and shipping options for the item 874. In some embodiments, the item listing page may also comprise a quantity field 875 for a user to enter a quantity of the item the user wants to purchase, a selectable "Add to Cart" button 876 for a user to add the entered quantity of the item to a shopping cart, and a selectable "Add to Watch List" button 877 for a user to add the item listing to a watch list so that the user may be notified of a change in status of the item listing.

In the contextual breadcrumbs section 820 of page 800e, a simplified representation 830 of page 800d may be added. In some embodiments, a visual representation of the flow from page 800c to page 800d may be represented in the contextual breadcrumbs. For example, an arrow (or some other connection indicator) may be used to show this flow. The simplified representation 830 may comprise context information regarding a function of the page 800d. For example, the context information may comprise an identification of page 800d as a shopping cart page, which may be represented by the label "Cart" 831. In some embodiments, the context information may comprise a simplified version some of the details of the items in the shopping cart. In some embodiments, these details may comprise the title of the item listing (e.g., KR9541) and the price of the item (e.g., $40.00). The context information in simplified representation 830 may also comprise a visual representation 832 of the quantity of the item in shopping cart (e.g., 1). Additionally, the context information may comprise a visual representation 833 of the shipping option (e.g., Economy Shipping) for the item in the shopping cart. As previously discussed, in some embodiments, the contextual breadcrumbs may be configured to enable a user to act upon functional options that are visually represented in the simplified representation of a page. For example, in some embodiments, the shipping option may be changed using a selectable mechanism 834 (e.g., a drop down menu) in the simplified representation 830 of the shopping cart page rather than going to the shopping cart page and changing the shipping option from there. However, in some embodiments, the contextual breadcrumbs may be configured to cause the corresponding web page of a simplified representation to be displayed in response to a selection (e.g., clicking) of the simplified representation, and the user may then make a change to a functional option of a page from the actual page.

Figure 8F:
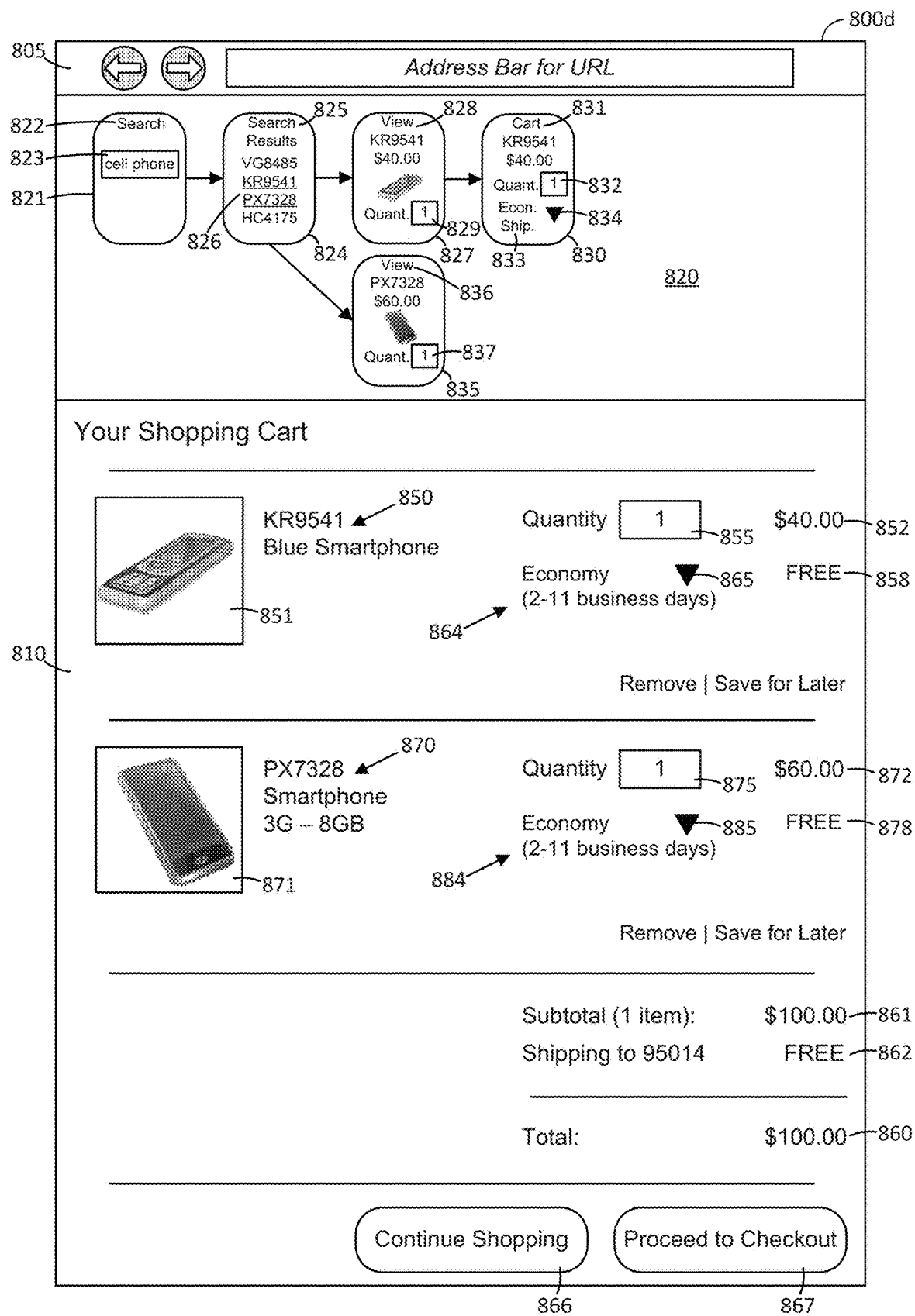

FIG. 8F illustrates an example embodiment of the shopping cart page 800d. The shopping cart page may be provided in response to a user selecting (e.g., clicking) the "Add to Cart" button 876 in FIG. 8E, which may add the item (e.g., PX7328) of the item listing in FIG. 8E to the shopping cart. The shopping cart page 800d may comprise the same information as it did in FIG. 8D, but may also include information about an item that has been added to the shopping cart of the website. For example, the shopping cart page may comprise the title or name for the item of the item listing 870, the image of the item 871, the price of the item 872, and the quantity of the item in the shopping cart 875. The shopping cart page may also comprise a shipping option 884 for the item and a shipping price 878 corresponding to the shipping option 884. In some embodiments, the shipping option 884 may be changed using a selectable mechanism 885 (e.g., a drop down menu).

In the contextual breadcrumbs section 820 of page 800d in FIG. 8F, a simplified representation 835 of page 800e may be added. In some embodiments, a visual representation of the flow from page 800b to page 800e may be represented in the contextual breadcrumbs. For example, an arrow (or some other connection indicator) may be used to show this flow. The simplified representation 835 may comprise context information regarding a function of the page 800e. For example, the context information may comprise an identification of page 800e as a page on which an item listing was viewed, which may be represented by the label "View" 836. In some embodiments, the context information may comprise a simplified version of some of the details of the viewed item listing. In some embodiments, these details may comprise the title of the item listing (e.g., PX7328), the price of the item (e.g., $60.00), and the image of the item. In some embodiments, the context information may comprise a visual representation of a selection or action of the user. For example, in FIG. 8F, the context information in simplified representation 835 may comprise a visual representation 837 of the quantity of the item that the user added to the shopping cart (e.g., 1).

As previously discussed, in some embodiments, the contextual breadcrumbs may be configured to enable a user to act upon functional options that are visually represented in the simplified representation of a page. For example, the user may change one of the functional options visually represented in the simplified representation 830 of the shopping cart. As a result of this user action on a functional option in the simplified representation 830, the selected functional option may be performed. In this example, the user may change the shipping option 833 for item "KR9541" from "Economy Shipping" to "Expedited Shipping" by using the selectable mechanism 834. As a result of the user changing the shipping option 833 in the simplified representation 830, a corresponding change may be made to the shipping option 864 in the shopping cart.

Figure 8G:
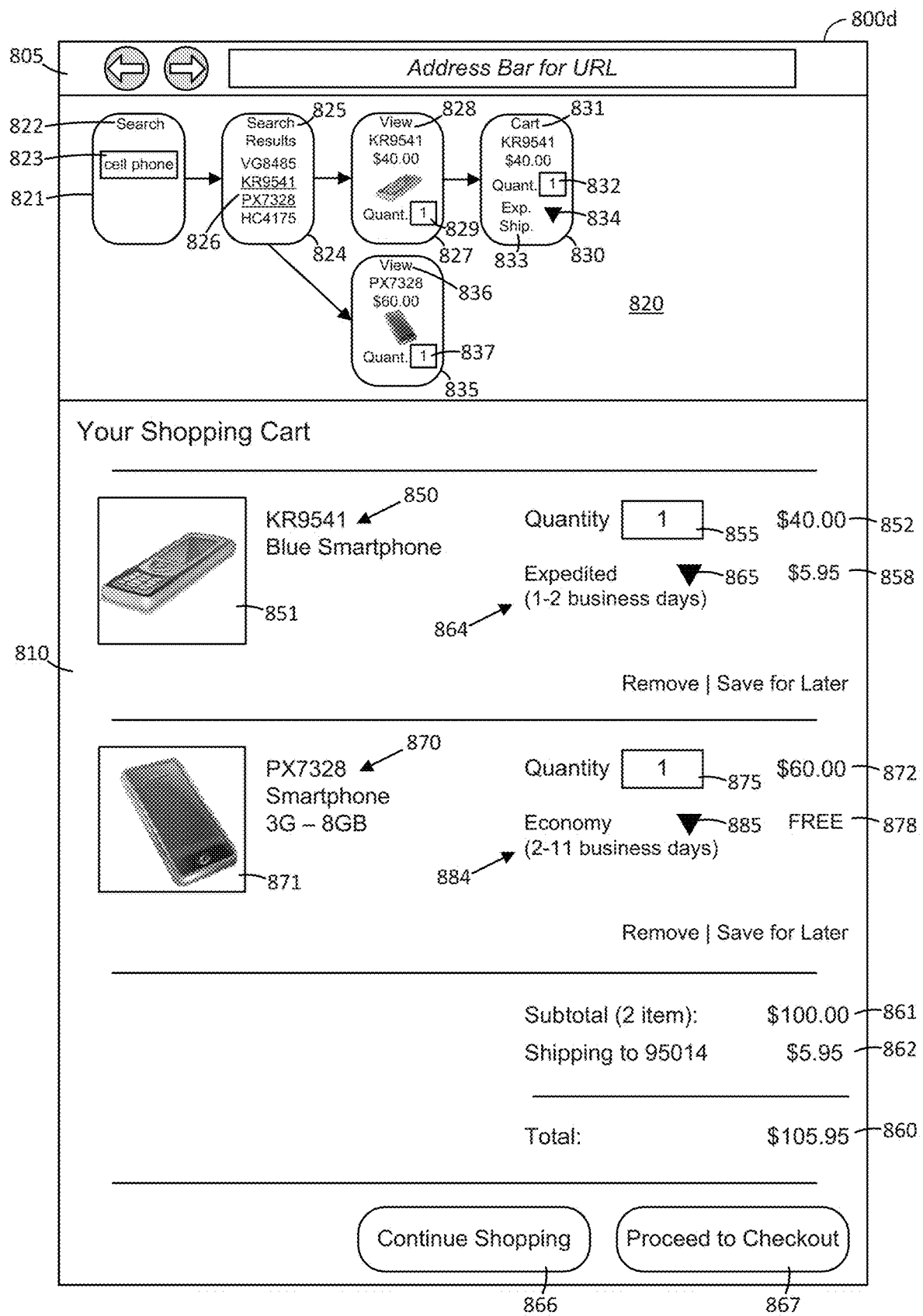

FIG. 8G illustrates an example embodiment of the shopping cart page 800d, where the user has changed the shipping option 864 in the shopping cart from "Economy Shipping" to "Expedited Shipping" by changing the shipping option 833 in the simplified representation 830. The change in one functional element may change other functional elements as well. For example, changing the shipping option 833 in the simplified representation 830 may not only change the shipping option 864 in the shopping cart, but it may also change the shipping price 858 (e.g., from FREE to $5.95), the total shipping cost 862, and the total purchase and shipping costs 860.

In some embodiments, the changing of properties for a functional element in a simplified representation may be conditioned upon the change not contradicting or invalidating any other functional element of a simplified representation. In some embodiments, a functional element may be changed even if the change does contradict or invalidate another functional element of a simplified representation. In some embodiments, the simplified representation of the functional element that is affected by this contradictory or invalidating change may be visually presented in a form indicating the contradiction or invalidation. In some embodiments, the affected simplified representation or the affected functional element may be displayed in a distinguishing color to indicate how it is affected. For example, the affected simplified representation may be colored red to indicate that one of its functional elements is in an error state or an inconsistent state. It is contemplated that other visual indications of a contradictory or invalidating action/state may be employed as well.

Figure 9:
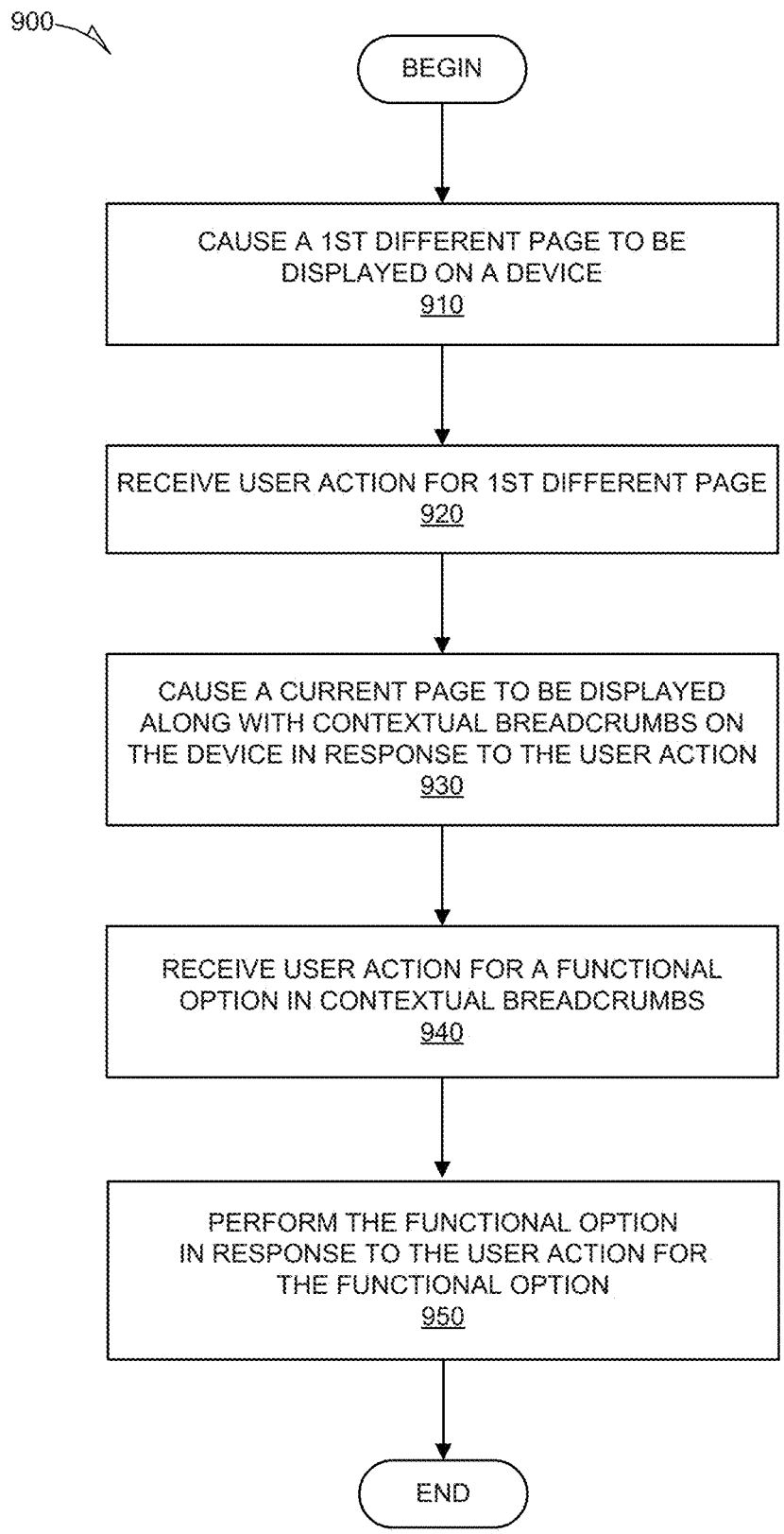
FIG. 9 is a flowchart illustrating an example method of providing contextual breadcrumbs.

FIG. 9 is a flowchart illustrating an example method 900 of providing contextual breadcrumbs. At operation 910, a first different page may be caused to be displayed on a device. In some embodiments, the first different page may be a part of a flow of multiple pages. In some embodiments, the flow of multiple pages may be for a single website (e.g., an e-commerce website). At operation 920, a user action for the first different page may be received. Many different types of user actions may be employed, including, but not limited to, activating a selectable link or button to load another page. In some embodiments, this activation may be performed after the user enters information (e.g., a keyword in a search field). At operation 930, a current page may be caused to be displayed on the device in response to the user action received at operation 920. Contextual breadcrumbs may be displayed on the current page. The contextual breadcrumbs may comprise a simplified representation of the first different page. The simplified representation of the first different page may comprise context information regarding a function of the first different page. This context information may comprise a visual representation of one or more functional options configured to be acted upon by a user and provided on the first different page. In some embodiments, the contextual breadcrumbs may be configured to enable the user to act upon a functional option of the first different page from the current page. At operation 940, a user action may be received for a functional option that is presented in the contextual breadcrumbs. For example, the user may select a link that is presented in the simplified representation of the first different page in the contextual breadcrumbs while the user is on the current page. At operation 950, the functional option, for which the user action is received, may be performed. For example, if the user selected a link in the simplified representation of the first different page, then a page corresponding to that link may be loaded. Other user actions and functional options are also within the scope of the present disclosure.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
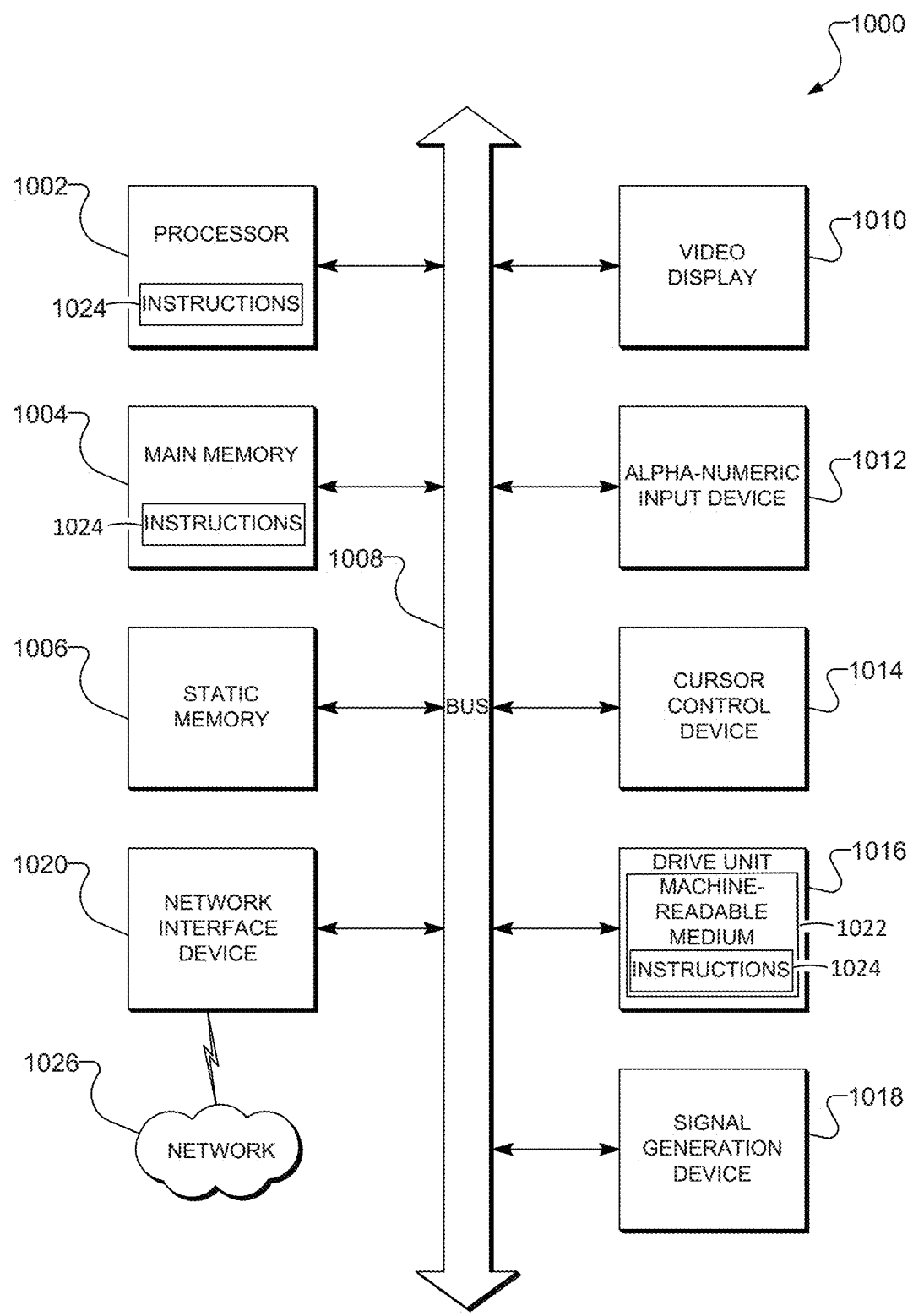
FIG. 10 shows a diagrammatic representation of a machine in the example form of a computer system within which a set of instructions may be executed to cause the machine to perform any one or more of the methodologies discussed herein.

FIG. 10 is a block diagram of a machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
    a client device comprising one or more processors, a display, and an input mechanism;
    at least one navigation application executable by the one or more processors to provide Internet navigation functionality that includes causing a current page to be displayed on the client device,
        the current page including at least one current actionable user interface (UI) element that is selectable by a user, the current actionable (UI) element comprising a plurality of selectable elements and an indication of a first selection;
    at least one context information application executable by the one or more processors, received as part of the content of the current page, the context information application configured to:
    (a) cause context information to be displayed on the client device as part of the current page,
        the context information providing a visual representation of a browsing history leading to the current page,
        the context information including a simplified representation of a previous page forming part of the browsing history and a simplified representation of the current page,
            the simplified representation of the previous page comprising at least one previous actionable user interface (UI) element that formed part of the previous page and that is selectable by the user from the current page to cause performance, from the current page, of a functional option corresponding to the selected actionable UI element,
            the simplified representation of the current page comprising at least one additional UI element corresponding to the current actionable UI element included the current page, the at least one additional actionable UI element being configured to receive input of a user selection without departing from the current page; and
    (b) in response to user interaction with the displayed context information, modify the display of the context information by:
        in response to the user selecting the at least one previous actionable UI element:
            causing navigation to the previous page by the navigation application and displaying the previous page;
            performing the functional option corresponding to the selected actionable UI element that formed part of the previous page; and
            updating the display of the context information to reflect the performance of the functional option and the navigation to the previous page; and in response to the user selecting the at least one additional UI element corresponding to the current actionable UI element included in the current page:
updating the display of the context information to reflect the user selection; and
changing the current actionable user UI element in the current page from the first selection to the user selection of the additional UI element in the simplified representation of the current page.

2. The system of claim 1, wherein the functional option of the previous page comprises a textual input element.

3. The system of claim 1, wherein the functional option of the previous page comprises a non-textual input element.

4. The system of claim 1, wherein the functional option of the previous page comprises a selectable widget.

5. The system of claim 1, wherein the at least one previous actionable UI element comprises selectable search results on the previous page.

6. The system of claim 5, wherein the at least one navigation application is configured to cause, responsive to user-selection of one of the selectable search results in the context information, display on the display of the client device of a search results page corresponding to the selected search result.

7. The system of claim 1, wherein the visual representation of the browsing history includes a visual representation of a flow that includes the visual representation of the previous page.

8. The system of claim 7, wherein the visual representation of the flow-provides an indication of a navigation from the simplified representation of the previous page to the simplified representation of the current page.

9. A method comprising:
in an operation performed on a client device comprising one or more processors, a display, and an input mechanism, using at least one navigation application executed by the one or more processors to provide Internet navigation functionality, causing a current page to be displayed on a client device,
the current page including at least one current actionable user interface (UI) element that is selectable by a user, the current actionable (UI) element comprising a plurality of selectable elements and an indication of a first selection; and
in an automated operation performed using at least one context information application executed by the one or more processors, received as part of the content of the current page, the context application:
(a) causing context information to be displayed on the client device as part of the current page,
the context information providing a visual representation of a browsing history leading to the current page,
the context information including a simplified representation of a previous page forming part of the browsing history and a simplified representation of the current page,
the simplified representation of the previous page comprising at least one previous actionable user interface (UI) element that formed part of the previous page and that is selectable by the user from the current page to cause performance, from the current page, of a functional option corresponding to the selected actionable UI element,
the simplified representation of the current page comprising at least one additional UI element corresponding to the current actionable UI element included the current page, the at least one additional actionable UI element being configured to receive input of a user selection without departing from the current page; and
(b) in response to user interaction with the displayed context information, modifying the display of the context information by:
in response to the user selecting the at least one previous actionable UI element:
causing navigation to the previous page by the navigation application and displaying the previous page;
performing the functional option corresponding to the selected actionable UI element that formed part of the previous page; and
updating the display of the context information to reflect the performance of the functional option and the navigation to the previous page; and
in response to the user selecting the at least one additional UI element corresponding to the current actionable UI element included in the current page:
updating the display of the context information to reflect the user selection; and
changing the current actionable user UI element in the current page from the first selection to the user selection of the additional UI element in the simplified representation of the current page.

10. The method of claim 9, wherein the functional option of the previous page comprises a textual input element.

11. The method of claim 9, wherein the functional option of the previous page comprises a non-textual input element.

12. The method of claim 9 wherein the functional option of the previous page comprises a selectable widget.

13. The method of claim 9, wherein the at least one previous actionable UI element comprises selectable search results on the previous page.

14. The method of claim 13, further comprising, responsive to user-selection of one of the selectable search results in the context information, causing the display of display on the client device of a search result page corresponding to the selected search result.

15. The method of claim 9, wherein the visual representation of the browsing history includes a visual representation of a flow that includes the visual representation of the previous page.

16. The method of claim 15, wherein the visual representation of the flow provides an indication of a navigation from the simplified representation of the previous page to the simplified representation of the current page.

17. A non-transitory computer readable storage medium storing instructions for causing a machine, in response to executing the instructions, to perform operations comprising:
causing a current page to be displayed on a client device comprising one or more processors, a display, and an input mechanism using at least one navigation application executed by the one or more processors to provide Internet navigation functionality,
providing Internet navigation functionality that includes causing a current page to be displayed on the client device,
the current page including at least one current actionable user interface (UI) element that is selectable by a user, the current actionable (UI) element comprising a plurality of selectable elements and an indication of a first selection; and in an automated operation performed using at least one context information application executed by the one or more processors, received as part of the content of the current page, the context application:
  (a) causing context information to be displayed on the client device as part of the current page,
    the context information providing a visual representation of a browsing history leading to the current page,
    the context information including a simplified representation of a previous page forming part of the browsing history and a simplified representation of the current page,
    the simplified representation of the previous page comprising at least one previous actionable user interface (UI) element that formed part of the previous page and that is selectable by the user from the current page to cause performance, from the current page, of a functional option corresponding to the selected actionable UI element,
    the simplified representation of the current page comprising at least one additional UI element corresponding to the current actionable UI element included the current page, the at least one additional actionable UI element being configured to receive input of a user selection without departing from the current page; and
  (b) in response to user interaction with the displayed context information, modifying the display of the context information by:
    when the user selects the at least one previous actionable UI element:
      causing navigation to the previous page by the navigation application and displaying the previous page;
      performing the functional option corresponding to the selected actionable UI element that formed part of the previous page; and
      updating the display of the context information to reflect the performance of the functional option and the navigation to the previous page; and
    when the user selects the at least one additional UI element corresponding to the current actionable UI element included in the current page:
      updating the display of the context information to reflect the user selection; and
      changing the current actionable user UI element in the current page from the first selection to the user selection of the additional UI element in the simplified representation of the current page.

* * * * *